United States Patent
Schlaudraff

(10) Patent No.: US 10,926,657 B2
(45) Date of Patent: Feb. 23, 2021

(54) METHOD FOR CONTROLLING AND PRIORITIZING A USER-SPECIFIC RECHARGING OF AN ENERGY STORAGE DEVICE OF A MOTOR VEHICLE AND A CONTROL DEVICE, CHARGING MANAGEMENT DEVICE, SERVER APPARATUS, AND MOTOR VEHICLE FOR ACHIEVING THE SAME

(71) Applicant: AUDI AG, Ingolstadt (DE)

(72) Inventor: Andreas Schlaudraff, Munich (DE)

(73) Assignee: AUDI AG, Ingolstadt (DE)

( * ) Notice: Subject to any disclaimer, the term of this patent is extended or adjusted under 35 U.S.C. 154(b) by 54 days.

(21) Appl. No.: 15/983,140

(22) Filed: May 18, 2018

(65) Prior Publication Data
US 2018/0354382 A1 Dec. 13, 2018

(30) Foreign Application Priority Data
Jun. 8, 2017 (DE) .......................... 102017209716.7

(51) Int. Cl.
*B60L 53/66* (2019.01)
*B60L 53/65* (2019.01)
(Continued)

(52) U.S. Cl.
CPC .......... *B60L 53/66* (2019.02); *B60L 11/1846* (2013.01); *B60L 53/14* (2019.02); *B60L 53/62* (2019.02);
(Continued)

(58) Field of Classification Search
CPC .. B60L 11/1846; B60L 2240/70; B60L 53/12; B60L 53/63; B60L 53/68;
(Continued)

(56) References Cited

U.S. PATENT DOCUMENTS 8,085,034 B2 * 12/2011 Sirton .................... G06Q 30/02
324/104
8,502,498 B2 * 8/2013 Fecher .................... B60L 53/63
320/109
(Continued)

FOREIGN PATENT DOCUMENTS

DE      102011083065 A1    3/2013
DE      102014103039 A1    9/2014
JP      2013042579 A       2/2013

*Primary Examiner* — Richard Isla
*Assistant Examiner* — Manuel Hernandez
(74) *Attorney, Agent, or Firm* — Maier & Maier, PLLC

(57) ABSTRACT

A method for controlling a charging operation of an energy storage device of a motor vehicle. A control device carries out the following: establishment of a prioritization of a motor vehicle for user-specific recharging of the energy storage device on the basis of the established prioritization; determination of a charging capacity predetermined by the prioritization for a recharging operation, depending on the determined charging capacity; creation of a digital certificate, which describes the determined charging capacity; and transmission of the created certificate to a charging management device of the motor vehicle. Depending on the charging capacity described by the certificate transmitted to the charging management device of the motor vehicle: generation of a control signal, which describes a course of the charging operation with the described charging capacity; and transmission of the created control signal to an energy delivery device of a charging station apparatus. Optionally, the charging capacity can be reduced by the certificate in the motor vehicle.

11 Claims, 2 Drawing Sheets

Figure 1:
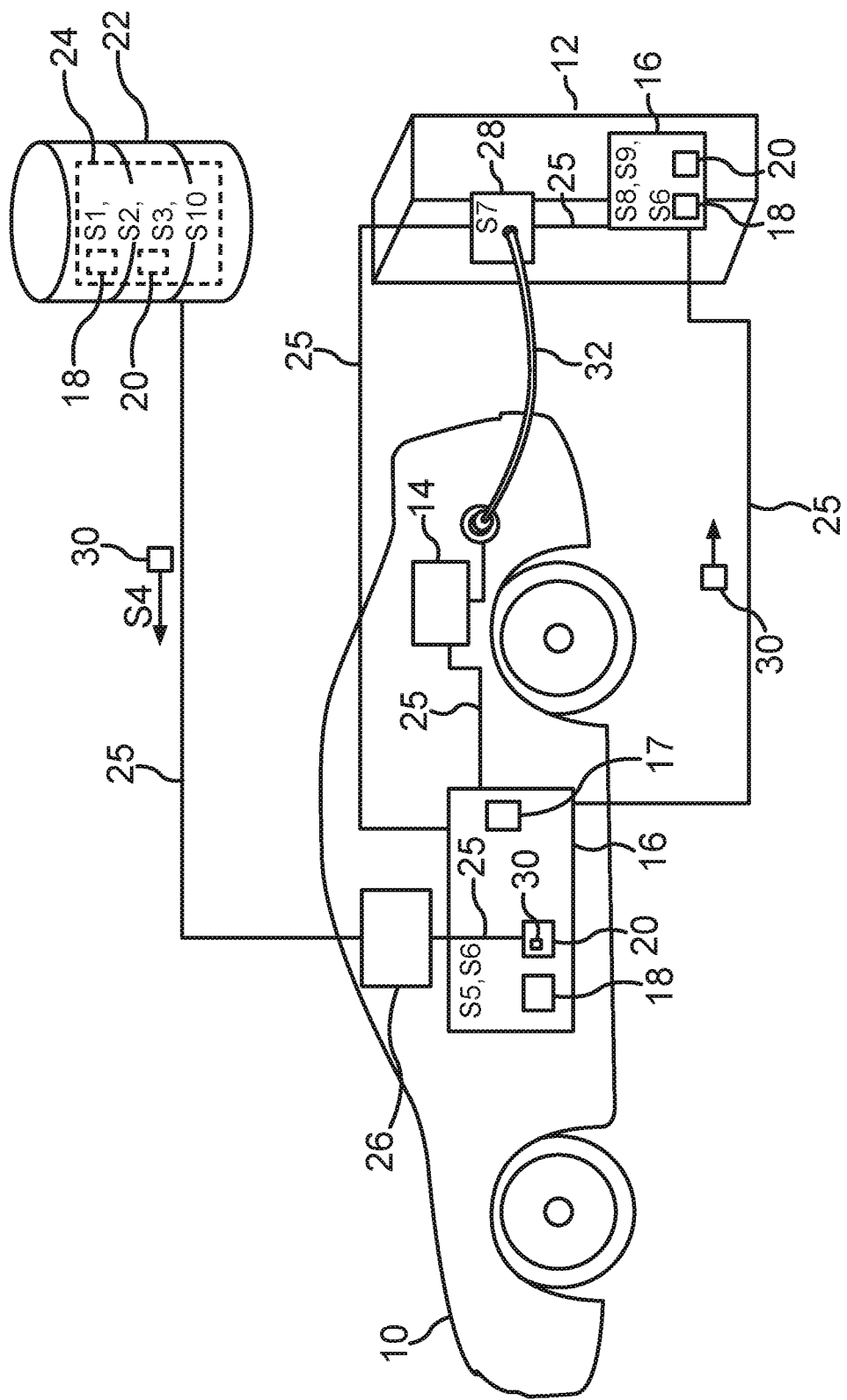

(51) Int. Cl.
  *B60L 53/14* (2019.01)
  *B60L 53/68* (2019.01)
  *B60L 53/62* (2019.01)
  *B60L 53/67* (2019.01)
  *B60L 11/18* (2006.01)
  *G06Q 20/38* (2012.01)
  *B60L 53/63* (2019.01)

(52) U.S. Cl.
  CPC ............... *B60L 53/65* (2019.02); *B60L 53/67* (2019.02); *B60L 53/68* (2019.02); *G06Q 20/38215* (2013.01); *B60L 53/63* (2019.02); *B60L 2240/70* (2013.01)

(58) Field of Classification Search
  CPC .......... B60L 53/67; B60L 53/62; B60L 53/14; B60L 53/65; B60L 53/665; B60L 58/12; B60L 53/66; G06Q 20/38215; G06Q 20/3821; G06Q 50/06; G07F 15/005
  USPC .......................................................... 320/109
  See application file for complete search history.

(56) References Cited

U.S. PATENT DOCUMENTS

| | | | | |
|---|---|---|---|---|
| 8,717,170 | B1* | 5/2014 | Juhasz | B60L 53/65 340/540 |
| 8,766,594 | B2* | 7/2014 | Gotz | B60L 53/305 320/109 |
| 9,248,752 | B2* | 2/2016 | Kuribayashi | B60L 53/11 |
| 9,881,286 | B2* | 1/2018 | Naito | H01M 10/44 |
| 9,975,446 | B2* | 5/2018 | Weber | B60L 11/1846 |
| 2009/0210357 | A1* | 8/2009 | Pudar | B60L 11/1842 705/412 |
| 2012/0049785 | A1* | 3/2012 | Tanaka | B60L 3/0046 320/106 |
| 2012/0200256 | A1* | 8/2012 | Tse | B60L 11/1816 320/109 |
| 2013/0057210 | A1* | 3/2013 | Nergaard | B60L 53/305 320/109 |
| 2013/0138542 | A1* | 5/2013 | Sirton | G06Q 10/0631 705/34 |
| 2013/0197710 | A1 | 8/2013 | Hansen et al. | |
| 2014/0028254 | A1* | 1/2014 | Shane | H02J 3/14 320/109 |
| 2014/0125279 | A1* | 5/2014 | Juhasz | B60L 3/12 320/109 |
| 2014/0266039 | A1* | 9/2014 | Dougherty | B60L 11/1844 320/109 |
| 2014/0320062 | A1 | 10/2014 | Murayama | |
| 2015/0073591 | A1* | 3/2015 | Falk | B60L 53/68 700/237 |
| 2016/0019492 | A1* | 1/2016 | Juhasz | G06Q 10/063114 705/7.15 |
| 2016/0193937 | A1* | 7/2016 | Dalum | H01M 10/48 701/22 |
| 2016/0200208 | A1* | 7/2016 | Faye | B60L 53/68 320/109 |
| 2016/0207413 | A1 | 7/2016 | Atluri et al. | |
| 2016/0380440 | A1* | 12/2016 | Coleman, Jr. | G05F 1/66 700/295 |
| 2017/0015210 | A1* | 1/2017 | Juhasz | B60L 11/1844 |
| 2017/0043671 | A1* | 2/2017 | Campbell | G01C 21/34 |
| 2017/0088001 | A1* | 3/2017 | Haas | B60L 11/1844 |
| 2017/0274792 | A1* | 9/2017 | Vaughan | B60L 53/68 |
| 2018/0111493 | A1* | 4/2018 | Chan | G01R 19/10 |
| 2019/0070970 | A1* | 3/2019 | Chan | H02J 7/0029 |
| 2020/0089909 | A1* | 3/2020 | Kim, II | B60L 53/66 |

* cited by examiner

METHOD FOR CONTROLLING AND PRIORITIZING A USER-SPECIFIC RECHARGING OF AN ENERGY STORAGE DEVICE OF A MOTOR VEHICLE AND A CONTROL DEVICE, CHARGING MANAGEMENT DEVICE, SERVER APPARATUS, AND MOTOR VEHICLE FOR ACHIEVING THE SAME

FIELD

The invention relates to a method for controlling a charging operation of an energy storage device of a motor vehicle. An energy storage device in this case understood to mean a device or a device component that is designed for storage of preferably electrical energy and can be equipped, for example, as a rechargeable battery or traction battery. The motor vehicle is accordingly an electric motor vehicle or a hybrid motor vehicle.

BACKGROUND

Present-day charging poles or charging stations can adjust the charging capacity for an electric vehicle depending on the number of motor vehicles that are just then being charged. A possible prioritization of a vehicle always starts with the charging pole or the interconnected composite system. However, this is only possible when the charging pole or the composite charging system is appropriately trained to recognize specific vehicles or vehicle groups. Such a system also does not function over a number of charging pole operators, thus it is, independent of an electricity supplier, for example.

For the case that many vehicles are being charged at charging stations and an available capacity at, for example, a charging park is less than the sum of the maximally requested charging capacity, it is currently the case that the maximally available charging capacity is distributed over the vehicles. For example, a maximum charging capacity of 120 kilowatts can be provided when only one motor vehicle is present at the charging station, but in the case that another motor vehicle is plugged in, the charging capacity can drop to 60 kilowatts per vehicle. As a result, the charging time for all motor vehicles is increased.

DE 10 2014 103 039 A1 describes a charging system for electric vehicles in which a prioritization of a fast-charging process is controlled depending on a session ID of a vehicle connected to a charging station.

Known from JP 2013-042579 A is a flexible charging station at which individual stations can be reserved.

U.S. 2014/0320062 A1 describes a motor vehicle management system, which takes into account a plurality of electric motor vehicles in accordance with a utilization sequence.

However, the problem described further above remains unsolved. An object on which the invention is based is to make available a charging management for a charging station with a plurality of charging points so as to make possible a predetermined charging time for prioritized motor vehicles.

SUMMARY

The object set forth is achieved by the method and the devices in accordance with the independent patent claims. Advantageous enhancements are presented in the dependent claims.

The invention is based on the idea of introducing a digital certificate, which may also be referred to as a marker, into a motor vehicle, wherein the certificate adjusts a charging capacity and, accordingly, makes possible an individual prioritization of the charging capacity independently of the number of motor vehicles standing at the charging station.

The method according to the invention for controlling a charging operation of an energy storage device of a motor vehicle has the following steps, which are carried out by a control device. In this case, control device is a device or a device component that is designed and equipped to receive and generate signals and certificates and, for example, can be designed as a control instrument or a control circuit board or a computer program product. The control device can preferably be a control device of a server apparatus external to the vehicle, such as, for example, a data server in the Internet or a backend, or, for example, a control device of the motor vehicle.

Established in a first method step is a prioritization of the motor vehicle, which has an energy storage device, for user-specific recharging of the energy storage device and, on the basis of the established prioritization, a determination of the charging capacity for a charging operation, said charging capacity being predetermined by the prioritization. Depending on the determined charging capacity, there occurs a creation of a digital certificate, which may also be referred to as a digital marker and which describes the determined charging capacity, and a transmission of the created certificate to a charging management device of the motor vehicle. The certificate describes, in other words, a charging authorization related to the charging capacity.

The digital certificate can be created, for example, depending on a charging capacity of the user that has been agreed upon in an electric vehicle electricity agreement with a provider of electricity for electric vehicles. For example, the user of the motor vehicle may have prepaid for 1000 kilowatts, or agrees to a monthly flat rate. The certificate can then describe, for example, the agreed-upon charging capacity, such as, for example, a charging with at least 120 kilowatts. For example, the certificate can describe information regarding the electric vehicle electricity agreement and the charging capacity or else only special information regarding the agreement and/or the charging capacity.

The digital certificate can be transmitted, for example, from a control device of a backend to the charging management device of the motor vehicle via, for example, a WLAN connection or via a wireless connection. Alternatively, such a digital certificate can also be transmitted via the charging station apparatus, such as, for example, via a transmission cable of the charging station apparatus as a wired communication link, which, for example, can be integrated into a charging cable. In this case, the control device can be a component of the charging station apparatus.

Depending on the charging capacity described by the certificate transmitted to the charging management device of the motor vehicle, there occurs a generation of a control signal, which describes a course of the charging operation with the described charging capacity. There follows a transmission of the created control signal to an energy delivery device of a charging station apparatus external to the motor vehicle. An energy delivery device is understood here to mean a device or component for transmitting energy to the energy storage device of the motor vehicle and can have, for example, an induction coil and/or a cable for so-called conductive charging and/or a pantograph current collector.

As a result, the energy storage device can be charged with priority. Even when there just then happens to be higher congestion at a charging station, a charging time for the motor vehicle having the certificate is not increased due to this congestion. Beyond this, new business models are possible in order for providers of electricity for electric vehicles to offer electricity in multiple ways, such as, for example, a faster charging or a contractually guaranteed minimum charging capacity.

In accordance with a preferred embodiment of the method according to the invention, a charging management device of the charging station enables the certificate to be received from the charging management device of the motor vehicle beforehand and enables a readout and/or an evaluation of the determined charging capacity to occur on the basis of the received certificate. In this case, the control signal can be generated by the charging management device of the charging station apparatus. For this purpose, the charging management device can have, for example, a receiver for receiving the certificate as well as a reader or an instrument for evaluation of the digital certificate. In the case of a wired transmission of the certificate to the charging management device, the receiver can be connected to the transmission cable.

The digital certificate can be transmitted to the charging management device of the charging station apparatus by means of, for example, a conventional data communication link. The charging station apparatus can set the described charging capacity, for example, and charge the energy storage device in accordance with the described charging capacity, even when just then many motor vehicles are situated at the charging station apparatus and are to be recharged at the same time. The available total amount [of charging capacity]* at the charging station apparatus can then be divided up in such a way that, for example, a motor vehicle having a certificate for a higher charging capacity obtains said charging capacity and other motor vehicles, which, for example, have no certificate or else have a certificate for a lower charging capacity, are recharged with a lower charging capacity. The motor vehicle having the digital certificate can therefore be recharged in an advantageous way with the predetermined charging capacity, without the charging operation lasting longer than anticipated or without the motor vehicle not obtaining as much electricity as actually planned.

In accordance with another preferred embodiment of the method according to the invention, the charging management device of the motor vehicle can adjust the charging capacity of the energy storage device, depending on the control signal, to a value described by the certificate, wherein the control signal can be generated by the charging management device of the motor vehicle. In other words, the motor vehicle can sign in with a specific charging capacity, that is, with the charging capacity described by the certificate, with which the charging operation is regulated by the motor vehicle. In accordance with this embodiment of the method according to the invention, the certificate does not need to be transmitted to the charging station apparatus. This is especially advantageous in the case when the motor vehicle is standing at a charging station apparatus that does not have corresponding hardware and/or software for evaluation of the certificate.

Additionally or alternatively, the digital certificate can be generated by the control device depending on the current position of the motor vehicle; and/or depending on a predetermined point in time and/or a predetermined period of time; and/or depending on a location of the charging station apparatus; and/or depending on a monetary amount received from a user account for a user.

In other words, the charging capacity described by the certificate can depend on whether the motor vehicle is located, for example, in a metropolitan area with many electric vehicles and/or the charging station apparatus specifies a more favorable or a more expensive rate for the energy or, for example, how much the user [of] the certificate has paid. In this way, the method according to the invention can be individualized still further, so that a corresponding charging operation can be tailored in a manner that is specific to the location or specific to the needs of the user, for example. If the certificate describes, for example, a predetermined point in time and/or a predetermined period of time, such as, for example, a period of time between 2 p.m. and 3 p.m., a bidirectional charging is made possible, because, through the anticipated time of day of the charging, for example, energy can be used from an electricity storage device or from an electric power grid of another city, which, at the time in question, has surplus electricity production. This improves the energy management of an electricity provider, of a household of the user of the motor vehicle, or of a municipality. During the evaluation of the certificate by the charging station apparatus, for example, it is possible, for example, to compare a current time of day with the specified time of the certificate.

In order to take into consideration that nowadays also many emergency electric vehicles exist and, on account of their function in an emergency, for example, need electrical power immediately or else need a large amount of electrical power, it is possible in accordance with another embodiment of the method according to the invention for the control device to establish a registration of the motor vehicle as an emergency vehicle with a predetermined right of way under traffic law, wherein the charging capacity can be determined depending on the established registration. Such an emergency vehicle can be, for example, a police patrol car or an ambulance. In this embodiment of the method according to the invention, said motor vehicles are then automatically prioritized at the charging station even in the case when very many motor vehicles are at the charging station apparatus for the charging of their energy storage units.

The object set forth above, with attainment of the advantages mentioned, is likewise solved by a control device, preferably having a processor device, wherein a processor device is understood to mean a device or a component for electronic data processing that has, for example, at least one microprocessor and/or at least one microcontroller. The control device according to the invention is equipped for the purpose of carrying out the method step relating to a control device in accordance with one of the above-described embodiments. Optionally, the processor device can be equipped for the purpose of executing program code stored on a data storage unit, which, when implemented by the processor device, carries out the method step relating to the control device.

The invention also relates to a charging management device, which preferably can have a processor device. The charging management device is equipped for the purpose of carrying out the method step relating to a charging management device in accordance with one of the above-described embodiments. This affords the above-mentioned advantages.

The above-mentioned advantages likewise ensue through a motor vehicle according to the invention, which preferably can be designed as an automobile—for example, as a passenger car with an energy storage device—that is, as an electric motor vehicle having an embodiment of the charging management device according to the invention. Optionally, the motor vehicle according to the invention can additionally have an embodiment of the control device according to the invention.

The object set forth above is also achieved, with attainment of the already mentioned advantages, by a server apparatus external to the motor vehicle, such as, for example, a data server in the Internet or a backend for operation in the Internet, which has an embodiment of the control device according to the invention.

The invention also includes enhancements of the method according to the invention that have features such as those already described in connection with the enhancements of the motor vehicle according to the invention. For this reason, the corresponding enhancements of the method according to the invention are not described once again here.

BRIEF DESCRIPTION

Figure 2:
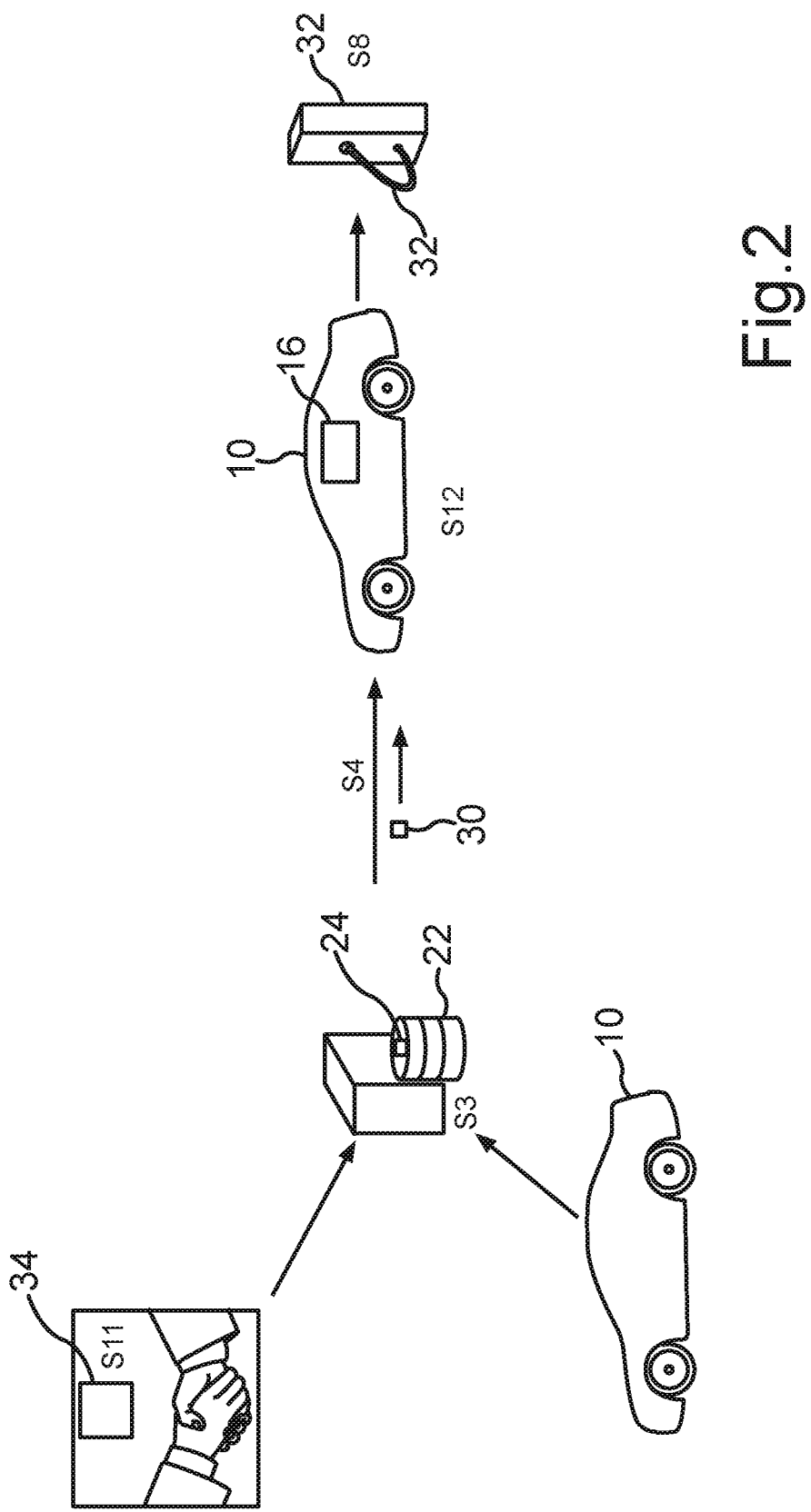

In the following, exemplary embodiments of the invention are described. Shown for this purpose are:

FIG. 1 a schematic illustration relating to a first embodiment of the method according to the invention; and FIG. 2 a schematic illustration relating to another embodiment of the method according to the invention.

DETAILED DESCRIPTION

The exemplary embodiments explained in the following are preferred embodiments of the invention. In the exemplary embodiments, the described components of the embodiment each represent individual features of the invention that are to be regarded independently of one another and that each further develop the invention independently of one another and hence are to be regarded, also individually or in a combination different from those shown, as belonging to the invention. Furthermore, the described embodiment can also be augmented by additional features of the already described features of the invention.

In the figures, functionally identical elements are furnished with the same reference numbers.

FIG. 1 illustrates the principle of the method according to the invention on the basis of a first exemplary embodiment. For this purpose, FIG. 1 shows a motor vehicle 10, which, by way of example, is standing just then at a charging station apparatus 12 in order to charge an energy storage device 14 of the motor vehicle 10.

The motor vehicle 10 can be designed, for example, as a passenger car and as an electric motor vehicle. The energy storage device 14 can be designed, for example, as a traction battery. The motor vehicle 10 has a charging management device 16, which, by way of example, can have a processor device 18 with, for example, a plurality of microprocessors. The charging management device 16 of the motor vehicle 10 of FIG. 1 further has an optional storage device 20, in which a corresponding program code for carrying out the method according to the invention can be stored.

FIG. 1 also shows a server apparatus 22 external to the motor vehicle, which can have a control device 24, wherein the control device 24 of the server apparatus 22 has an optional processor device 18 and an optional storage device 20.

The server apparatus 22 can be connected to the motor vehicle 10 via a data communication link 25, for example. For a communication between the motor vehicle and the control device 24 of the server apparatus 22, it is possible to provide, for example, a communication device 26 of the motor vehicle, which can be designed as an apparatus for creating data communication links as known to the person skilled in the art. The communication device 26 can be connected to the control device 24 via, for example, a wireless connection and/or an Internet connection to the control device 24.

Optionally, the motor vehicle 10 can have a control device 24, which can carry out the method step of the control device described further below.

The charging station apparatus 12 of FIG. 1 also shows a charging management device 16, which can be provided optionally. FIG. 1 also shows an energy delivery device 28 of the charging station apparatus 12, which, for example, can have an induction coil and/or a cable for so-called conductive charging and/or a pantograph current collector and/or another technology known to the person skilled in the art for delivering energy.

In a first method step S1, the control device 24 establishes a prioritization of the motor vehicle 10 for specific charging of the energy storage device 14. For example, a user of the motor vehicle 10 may have purchased by means of a mobile end device (not shown in FIG. 1) or by use of computer, for example, a flat rate for charging of the energy storage device 14 with a charging capacity of 80 to 100 kilowatts, that is, [at] a corresponding charging speed. On the basis of this purchase operation, the prioritization can be established (S1). On the basis of the prioritization, the predetermined charging capacity, that is, by way of example, the charging speed of 80 to 100 kilowatts is established (S2).

In the method step S3, the control device 24 creates a digital certificate 30, which can describe the prioritization and the charging capacity. In this case the certificate 30 can be a file, which can describe a charging speed by way of example. The certificate created in the method step S3 is transmitted to the charging management device 16 (S4) via, for example, an Internet connection or a wireless connection. Optionally, the charging management device 16 can comprise, for example, a central high-security certificate control unit 17, in which the certificate 30 is deposited and, when needed, for example, can be further transmitted to another component of the charging management device 16.

The certificate 30 that is received by the communication device 26, for example, can be transmitted by the latter to the storage device 20, where the digital certificate 30 can be stored.

In the example of FIG. 1, the motor vehicle 10 is shown as it is standing just then at the charging station apparatus 12 and is already connected by means of a cable 32 to the energy delivery device 28. The operation for creating the certificate 30 and the transmission of the certificate 30 to the motor vehicle 10, which were described further above, can also take place independently of the charging operation; that is, the method steps described further above can preferably take place in any desired period of time prior to a charging operation and depend neither on a connection to the charging station apparatus 12 nor on a location of the charging station apparatus 12. The use of the certificate 30 for controlling the charging operation takes place only when the motor vehicle 10 drives to any desired charging station apparatus 12 and the charging operation is to be initiated.

Serving to control the charging operation is a control signal, which, for example, can be generated by the charging management device 16 of the motor vehicle 10 (S5). The control signal can then describe a setting of the charging capacity described by the certificate 30, that is, by way of example, the 80 to 100 kilowatts. The control signal can be transmitted to the energy storage device 14, for example, or else directly transmitted from, for example, a control chip of the charging management device 16 for regulation and/or specification of the charging capacity and/or for controlling the charging capacity. Alternatively, the control signal describing the charging capacity can be transmitted directly to the energy delivery device 28 of the charging station apparatus 12 via a wireless connection or a cable connection 32, for example. The charging of the energy storage device 14 then occurs depending on the control signal, so that the charging station apparatus 12 does not actively set the charging capacity, but rather simply follows the specifications of the control signal from the charging management device 16 of the motor vehicle 10. The charging of the energy storage device 14 can then occur in the method step S7.

In an alternative exemplary embodiment, the charging management device 16 of the charging station apparatus 12 can receive the certificate 30, instead of the control signal, from the charging management device 16 of the motor vehicle 10 (S8) via the cable connection 32 or via a wireless connection or an Internet connection, for example. Shown in FIG. 1, by way of example, is a corresponding data communication link 25 between the two charging management devices 16, although the transmission can alternatively also occur via the communication device 26 of the motor vehicle 10 and/or via a communication device of the charging station apparatus 12.

In this example, the charging station apparatus 12 can have, for example, a reader and/or software of the charging management device 16 for readout and/or evaluation of the certificate 30. Such corresponding hardware and/or software can read out and/or evaluate the certificate 30 (S9) and the charging management device 16 [of the vehicle] can generate a corresponding control signal (S5) and transmit it to the energy delivery device 28 (S6).

If the motor vehicle 10 is, for example, an emergency vehicle, such as, for example, an ambulance, then the motor vehicle can be registered as such, for example, and a corresponding registration can be retrieved by the control device 24, for example, or transmitted to the control device 24. The certificate 30 can then describe this registration as a charging with prioritized treatment at a charging station apparatus 12 and/or, for example depending on the registration, can set the charging capacity at a charging capacity of 120 kilowatts, for example (S2).

Overall, the examples show how a prioritization and/or control of a charging capacity of electric vehicles and/or hybrid vehicles is made possible, such as, for example, a backend-controlled prioritization.

In accordance with another exemplary embodiment, it is possible, for example, by way of an online connection via, for example, the server apparatus 22, which, by way of example, can be designed as a backend of the vehicle manufacturer, to introduce into the motor vehicle 10 a marker or a plurality of markers, that is, a digital certificate 30 or a plurality of digital certificates 30, which makes or make possible a prioritization of the charging capacity. In accordance with a first variant of the charging station apparatus 12—for example, a charging pole—the digital certificate 30, which is responsible for adjusting the charging capacity (faster or slower charging/pause in charging/end of charging), can be read out (S9) and/or interpreted and the charging capacity can then be adjusted. In a second variant, a maximum/minimum allowed charging speed can, for example, be reduced in the motor vehicle 10; that is, the motor vehicle 10 does not at all draw more current than, by way of example, a charging pole would deliver, because, by way of example, the charging pole "thinks" that the motor vehicle 10 is only a motor vehicle 10 with a lower charging capacity.

In accordance with another exemplary embodiment, it is additionally possible to provide for a private charging in that, by way of example, the use of such a certificate 30 is limited not only to public charging station apparatuses 12, but the charging can also be adapted to a private setting, if appropriate. Conceivable is, for example, a future control of motor vehicles 10 directly by a network operator and, accordingly, a bidirectional energy exchange in the case that, for example, an electrical power grid in Munich is under heavy load and motor vehicles 10 may be charged only with 3.6 kilowatts, whereas motor vehicles 10 connected in Ingolstadt are already fully charged and electrical power could be delivered in order to relieve the grid in Munich, for example.

In accordance with another exemplary embodiment, the following three exemplary applied examples for public charging occur. In accordance with a first applied example, it is possible, for example, for a user to purchase an electric vehicle electricity agreement 34 through a provider of electricity for electric vehicles, such as, for example, a flat rate for a charging speed (for example 80 to 100 kilowatts) for 1000 € per year (see FIG. 2). For a premium, the charging capacity at the charging pole can be increased further; for example, for 1200 € per year, it is possible to charge faster between 120 to 150 kilowatts. A notification that faster and/or slower charging may be carried out can be introduced into the motor vehicle 10 online, for example, via a backend such as a server apparatus 22. It is possible, for example, to carry out an evaluation via, by way of example, either the charging pole or the motor vehicle 10 and, for example, to evaluate a reduced maximally possible charging capacity.

In a second applied example, it is possible, for example, for a police patrol car, a fire department vehicle, or a VIP vehicle to have a higher charging priority than a normal vehicle and accordingly to be charged with priority, because, for example, the certificate 30 of the emergency vehicle displays a preferential treatment.

In accordance with a third applied example, a user or a plurality of users can spontaneously order, for example, a faster charging when they have chosen beforehand, for example, a "slower" contract, but are especially in a hurry today (for example, purchase of an upgrade package to "charge faster one time for 2.99 €").

In accordance with another exemplary embodiment, a certificate 30 can be cancelled or retracted, for example, or the certificate 30 can be declared invalid when, for example, an expiration date described by the certificate has passed.

In accordance with another exemplary embodiment relating to, by way of example, a technical implementation, the certificate 30, that is, by way of example, the marker, can be introduced, for example, by way of an online connection of the motor vehicle 10. For this purpose, FIG. 2 shows once again a schematic illustration relating to this further exemplary embodiment of the method according to the invention.

A user of the motor vehicle 10 can be, for example, a customer at a motor vehicle manufacturer and may have concluded, in the method step S11, for example, an electric vehicle electricity agreement 34 with a provider of electricity for motor vehicles on, for example, a flat rate with a guaranteed charging capacity of 120 to 150 kilowatts. The data can optionally be deposited in the control device 24 of the server apparatus 22. The control device 24 of the server apparatus 22 creates a digital certificate 30 for the motor vehicle 10 (S3) in question and delivers it, for example, by transmitting it to the motor vehicle 10 (S4)—for example, to a charging management device 16 of the motor vehicle 10. The certificate 30 can be stored in the motor vehicle 10 (S12) in, for example, the charging management device 16, which can be, for example a component of an onboard charging unit and/or another charging device, such as, for example, a charging control device or a certificate control instrument 17.

In a first variant, the certificate 30 can be transmitted via, for example, an ISO standard to the charging station apparatus 12, which, by way of example, is a charging pole, and interpreted there, that is, for example, evaluated and/or read out. This variant can be used depending on the intelligence of the charging pole.

In a second variant, the certificate 30 in the motor vehicle 10 can trigger a behavior that causes the charging pole to believe that a motor vehicle 10 with lower charging capacity is connected (independent of charging pole).

FIG. 2 likewise illustrates an exemplary embodiment, in accordance with which the motor vehicle 10 can be, for example, a police vehicle, which can always be charged with a maximum capacity and prioritized over other customers or users at the charging pole.

The invention claimed is:

1. A method for controlling a charging operation of an energy storage device of a motor vehicle, comprising the following steps carried out by a control device:
   establishment of a prioritization of a motor vehicle for user-specific recharging of the energy storage device by which the motor vehicle may receive a greater charging capacity than a non-prioritized motor vehicle or a lower-prioritized motor vehicle,
   on the basis of the established prioritization, determination of a charging capacity for a recharging operation predetermined by the prioritization,
   depending on the determined charging capacity, creation of a digital certificate, which describes the determined charging capacity, and
   transmission of the created certificate to a charging management device of the motor vehicle and storage of the created certificate in a central high-security certificate control unit of the motor vehicle,
   the method being characterized, in addition, by the following steps:
   depending on the charging capacity described in the certificate transmitted to the charging management device of the motor vehicle, generation of a control signal, which describes a course of the charging operation with the described charging capacity, and
   transmission of the generated control signal to an energy delivery device of a charging station apparatus,
   wherein, depending on the charging station apparatus, the control signal is modified to communicate a vehicle charging capacity that is different from a rated charging capacity of the energy storage device of the motor vehicle in order to achieve the established prioritization.

2. The method according to claim 1, the following steps carried out by a charging management device of the charging station apparatus:
   receipt of the certificate from the charging management device of the motor vehicle, and
   readout of the determined charging capacity on the basis of the received certificate,
   wherein the control signal is generated by the charging management device of the charging station apparatus.

3. The method according to claim 1, the following step carried out by the charging management device of the motor vehicle:
   depending on the control signal, setting of the charging capacity of the energy storage device to a value described by the certificate,
   wherein the control signal is generated by the charging management device of the motor vehicle.

4. The method according to claim 1, wherein the digital certificate is generated as a function of
   a current position of the motor vehicle, and/or
   a predetermined point in time and/or a predetermined period of time, and/or
   a location of the charging station apparatus, and/or
   a monetary amount received from a user account of a user of the motor vehicle.

5. The method according to claim 1, the following step that is carried out by the control device:
   establishment of a registration of the motor vehicle as an emergency vehicle with a predetermined right of way under traffic law,
   wherein the charging capacity is determined depending on the established registration.

6. A control device, preferably having a processor device, wherein the control device is equipped for the purpose of carrying out the method steps relating to a control device in accordance with a method of the claim 1.

7. A motor vehicle having a control device according to claim 6.

8. A server apparatus external to the motor vehicle for operation in the Internet, having a control device according to claim 6.

9. A charging management device, preferably having a processor device, wherein the charging management device is equipped for the purpose of carrying out the method steps relating to a charging management device in accordance with a method of claim 1.

10. A motor vehicle having a charging management device according to claim 9.

11. The method according to claim 1, wherein the digital certificate comprises an expiration date, after which date the digital certificate is deemed invalid and can no longer authorize the charging operation.

* * * * *